United States Patent
Gomach et al.

(10) Patent No.: US 11,339,334 B2
(45) Date of Patent: May 24, 2022

(54) MULTI-STAGE CONTACTING PROCESS AND APPARATUS

(71) Applicant: Merichem Company, Houston, TX (US)

(72) Inventors: Jeffrey Bruce Gomach, League City, TX (US); John Jagger, Friendswood, TX (US); Baisheng Zou, Pearland, TX (US); James McGehee, Houston, TX (US)

(73) Assignee: Merichem Company, Houston, TX (US)

( * ) Notice: Subject to any disclaimer, the term of this patent is extended or adjusted under 35 U.S.C. 154(b) by 84 days.

(21) Appl. No.: 16/784,049

(22) Filed: Feb. 6, 2020

(65) Prior Publication Data

US 2021/0246375 A1 Aug. 12, 2021

(51) Int. Cl.
*B01J 14/00* (2006.01)
*B01D 11/04* (2006.01)
*C10G 17/04* (2006.01)
*C10G 32/00* (2006.01)

(52) U.S. Cl.
CPC .......... *C10G 17/04* (2013.01); *B01D 11/0415* (2013.01); *B01J 14/005* (2013.01); *C10G 32/00* (2013.01)

(58) Field of Classification Search
CPC ..... B01J 14/005; B01J 14/00; B01D 11/0449; B01D 11/0453; C10G 17/04; C10G 17/06
See application file for complete search history.

(56) References Cited

U.S. PATENT DOCUMENTS

| 3,977,829 A | 8/1976 | Clonts |
| 5,176,725 A * | 1/1993 | Puri ..................... B01D 63/04 96/8 |
| 5,662,861 A | 9/1997 | Taylor |
| 7,207,445 B2 | 8/2007 | Manna et al. |
| 8,128,825 B2 | 3/2012 | Massingill |
| 8,308,957 B2 | 11/2012 | Zhang et al. |
| 8,454,824 B2 * | 6/2013 | Zhang .................... C10G 33/06 210/201 |
| 9,168,469 B2 | 10/2015 | Massingill |
| 9,656,185 B2 | 5/2017 | McGehee et al. |

(Continued)

FOREIGN PATENT DOCUMENTS

| CN | 2379189 Y | 5/2000 |
| CN | 102743896 A | 10/2012 |

(Continued)

OTHER PUBLICATIONS

International Search Report and Written Opinion for Application No. PCT/US2021/013664, dated Jul. 5, 2021.

*Primary Examiner* — Lessanework Seifu
(74) *Attorney, Agent, or Firm* — C. Tumey Law Group PLLC (57) ABSTRACT

A method may include: introducing a fluid comprising a first immiscible phase and a second immiscible phase into a contacting vessel comprising multiple contact stages: flowing the fluid through a first fiber bundle disposed in the contacting vessel; separating at least a portion of the first immiscible phase from the second immiscible phase; and flowing the separated portion of the first immiscible phase through a second fiber bundle disposed in the contacting vessel.

23 Claims, 6 Drawing Sheets

(56) References Cited

U.S. PATENT DOCUMENTS

| | | |
|---|---|---|
| 10,300,407 B2 | 5/2019 | McGehee et al. |
| 2013/0026086 A1 | 1/2013 | Zhang et al. |
| 2014/0014593 A1 | 1/2014 | McGehee et al. |
| 2017/0216741 A1 | 8/2017 | McGehee et al. |
| 2019/0192995 A1 | 6/2019 | McGehee et al. |
| 2019/0218462 A1 | 7/2019 | McGehee et al. |

FOREIGN PATENT DOCUMENTS

| | | |
|---|---|---|
| CN | 105778991 A | 7/2016 |
| SU | 428759 A1 | 5/1974 |

* cited by examiner

MULTI-STAGE CONTACTING PROCESS AND APPARATUS

BACKGROUND

Chemical processes often require multiple unit operations to produce a particular product stream. A particular unit operation may be a fluid-fluid contacting operation whereby two fluids are brought into intimate contact to promote mass transfer between the fluids, a reaction between components in the fluids, or both. An example of fluid-fluid contacting may be liquid-liquid contacting. Liquid-liquid contacting may be beneficial in some types of chemical reactions where one reactant is miscible in a first liquid but immiscible in a second liquid. An example of such a reaction may be where a first reactant is present in a polar solvent such as water and a second reactant is present in a non-polar solvent such as a hydrocarbon and the water and hydrocarbon are immiscible. Liquid-liquid contacting may have several applications such as liquid-liquid extraction whereby a species present in a first liquid is extracted into a second liquid by mass transfer across the liquid-liquid interface.

A particular challenge of fluid-fluid contacting may be ensuring adequate contact area between the two fluids such that the mass transfer or reactions may occur in an appreciable amount and in an economically viable manner. In general, fluid-fluid contacting operations may be performed with immiscible fluids, such as, for example, an aqueous liquid and a hydrocarbon liquid. Using two immiscible fluids may allow the fluids to be readily separated after the fluid-fluid contacting is completed. However, when a fluid-fluid contacting operation is performed with immiscible fluids, phase separation may occur before adequate contact between the fluids is achieved.

Several fluid-fluid contacting vessels and techniques have been developed to enhance the contact area between fluids in a fluid-fluid contacting process, including, but not limited to, fiber-bundle type contactors. A fiber-bundle type contactor may generally comprise one or more fiber bundles suspended within a shell and one or more inlets where the fluids may be introduced into the shell. The fiber bundle may promote contact between the fluids by allowing a first fluids to flow along individual fibers of the fiber bundles and a second fluids to flow between the individual fibers thereby increasing the effective contact area between the fluids. The two fluids may flow from an inlet section of the shell to an outlet section of the shell while maintaining intimate contact such that a reaction, mass transfer, or both may be maintained between the two fluids.

There may exist challenges with designing and operating fiber-bundle type contactors. Some fluid-fluid contactors may require large physical footprints to achieve adequate mass transfer between the fluids phases. Mass transfer between phases may be a function of surface area and therefore increasing surface area by making the fiber bundles larger or longer may also increase mass transfer between the fluids. Not only does producing a physically larger fiber bundle increase cost, there may be secondary considerations when the fiber bundle is larger. One consideration may be pressure drop across the fluid-fluid contactor which may increase with longer vessels and fiber bundles. Another consideration of larger fiber bundles may be phase separation whereby the relatively heavier, or denser, fluids may begin to migrate to the center of the fiber-bundle while the relatively lighter, or less dense, fluid may begin to migrate to the outside of the fiber-bundle. Similarly, in reaction applications, some reactions may require long residence times within a reactor to achieve adequate conversion which may in turn require larger fiber bundles.

SUMMARY

In an embodiment, apparatus may comprise: a body; a first partition in the body defining a first flow path between the body and the first partition; a first fiber bundle disposed within the first flow path; a second partition in the body defining a second flow path between the first partition and the second partition; a third partition in the body defining a third flow path between the second partition and the third partition; and a second fiber bundle disposed within the third flow path. In another embodiment, a method may comprise: introducing a fluid comprising a first immiscible phase and a second immiscible phase into a contacting vessel comprising multiple contact stages: flowing the fluid through a first fiber bundle disposed in the contacting vessel; separating at least a portion of the first immiscible phase from the second immiscible phase; and flowing the separated portion of the first immiscible phase through a second fiber bundle disposed in the contacting vessel. In another embodiment, A method may comprise: introducing a fluid comprising a hydrocarbon fluid and an aqueous fluid into a contacting vessel; flowing the fluid through a first fiber bundle disposed in the contacting vessel; separating a portion of the hydrocarbon from the fluid; combining the separated portion of the hydrocarbon with an additional amount of the aqueous solution to form a second fluid; and flowing the second fluid through a second fiber bundle disposed in the contacting vessel.

BRIEF DESCRIPTION OF THE DRAWINGS

These drawings illustrate certain aspects of some of the embodiments of the present disclosure, and should not be used to limit or define the disclosure.

DETAILED DESCRIPTION

The present disclosure may relate to fluid-fluid mass transfer devices, and in some embodiments, to a multi-stage liquid-liquid mass transfer device or a multi-stage gas-liquid mass transfer device comprising multiple contacting zones within a vessel. A fiber-bundle may be disposed in each contacting zone which may provide non-dispersive phase contact between fluids in the contacting zone which may have certain advantages over dispersive mixing mass transfer devices. A multi-stage fluid-fluid mass transfer device may have a smaller physical footprint than a single stage fluid-fluid mass transfer device that achieves the same mass transfer.

Figure 1:
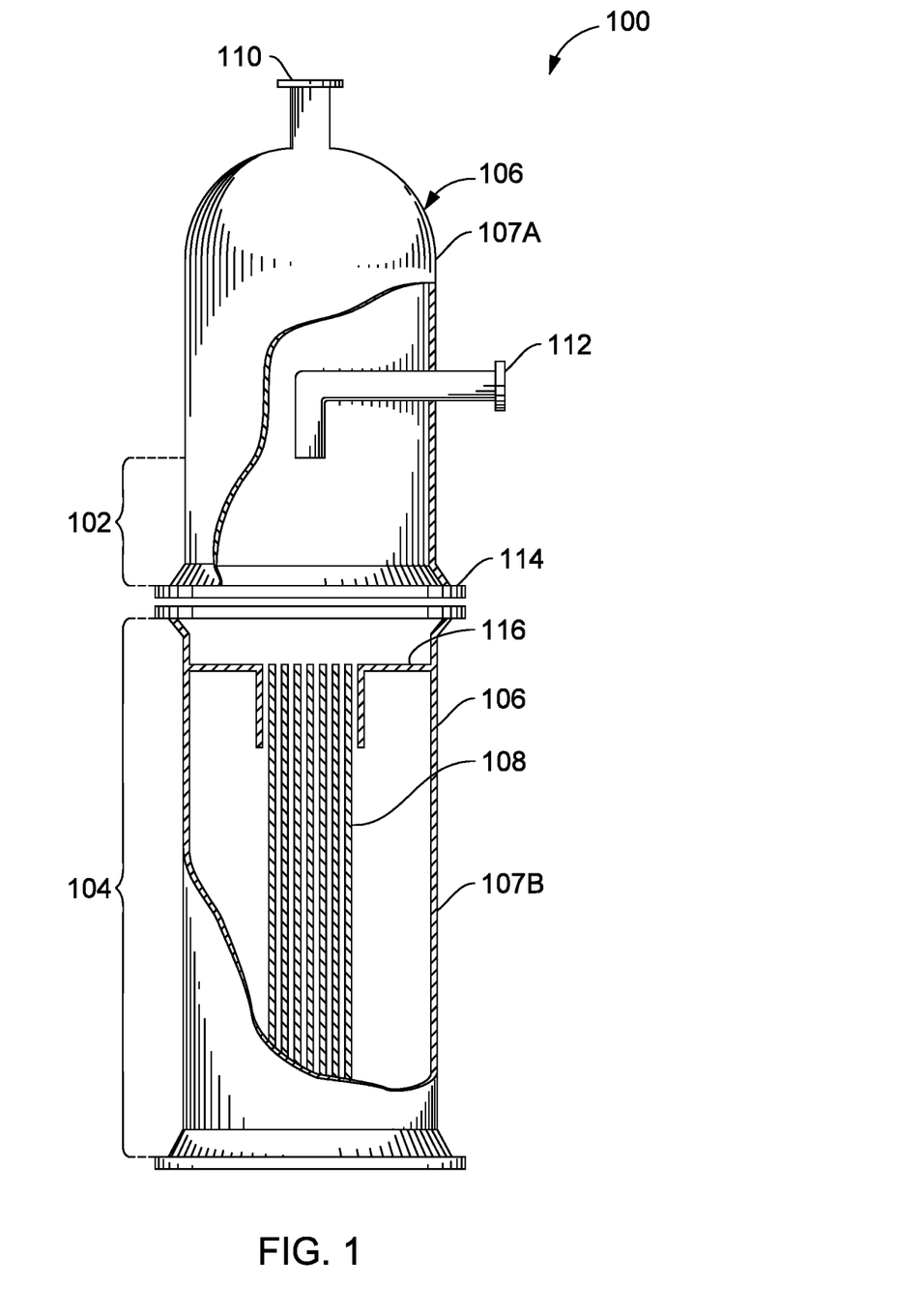
FIG. 1 is a schematic diagram illustrating an embodiment of a fluid-fluid mass transfer device.

FIG. 1 illustrates, in schematic form, an embodiment of a fiber-bundle type mass transfer device 100. Fiber-bundle type mass transfer device 100 may comprise vessel 106 which may contain and/or otherwise support equipment and features required for fluid-fluid contacting. As illustrated, vessel 106 may comprise two sections 107a, 107b joined by flange 114 which may provide a mounting point to secure the two sections 107a, 107b of vessel 106 together. Alternatively, vessel 106 may comprise a single continuous vessel (not shown) without flange 114 or may comprise a plurality of pieces (not shown) joined by flanges or otherwise secured together. As illustrated, fiber-bundle type mass transfer device 100 is oriented in a vertical direction. One of ordinary skill in the art will appreciate that fiber-bundle type mass transfer device 100 may be oriented in any direction, such as, for example, horizontally, vertically, or at any angle in between. Vessel 106 may comprise various inlets configure to allow fluids to enter into vessel 106. Vessel 106 may comprise a first inlet 110 and a second inlet 112, for example, which may allow fluids such as gasses, liquids, and vapors to enter vessel 106. Although only two inlets are illustrated, one of ordinary skill in the art would understand that any number of inlets may be used for a particular application. Fiber-bundle type mass transfer device 100 may further include features which promote mixing and contact between fluids introduced into vessel 106. For example, fiber-bundle type mass transfer device 100 may include a mixing zone 102 and a contacting vessel 104. Mixing zone 102 may comprise various features such as fluid inlets and mechanical features may promote mixing and distribution of fluids before the fluids enter contacting vessel 104. Contacting vessel 104 may comprise various features which may promote fluid-fluid contact to effectuate mass transfer, chemical reactions, or both between the fluids.

In some embodiments, contacting vessel 104 may comprise one or more fiber bundles 108. Although only one fiber bundle 108 is illustrated, one of ordinary skill in the art will appreciate that any number of fiber bundles may be present. Additionally, without limitation, the fiber bundles may be arranged in series, parallel, series and parallel, or any other configuration. Fiber bundle 108 may comprise elongated fibers that extend from or below mixing zone 102 through contacting vessel 104. Fiber bundle 108 may promote contact between the fluids introduced into vessel 106 by allowing a first fluid to flow along individual fibers of fiber bundle 108 and a second fluid to flow between the individual fibers. In some embodiments, the fibers of fiber bundle 108 may be metallic or non-metallic. Any suitable fibers may be used for fiber bundle 108, including, but not limited to glass, fiberglass, rayon, nylon, polyesters, polyolefins, polytetrafluoroethylene, steel, aluminum, tungsten, nickel, and combinations thereof. In some embodiments, the fiber bundle may comprise metal fibers.

Each of the embodiments described herein may generally operate by the same physical phenomena. Two immiscible fluids may be individually introduced into vessel 106 through first inlet 110 and second inlet 112 and flow through mixing zone 102 into contacting vessel 104. In some embodiments, a first fluid introduced through first inlet 110 may be relatively lighter, or less dense, than a second fluid introduced through second inlet 112. Alternatively, a first fluid introduced through first inlet 110 may be relatively heavier, or denser, than a second fluid introduced through second inlet 112. As one of ordinary skill in the art will appreciate, mixing of the two fluids may increase the effective surface area of extraction zone 104 which in turn may reduce the required length of extraction zone 104, decrease pressure drop across fiber-bundle type mass transfer device 100, reduce material costs, reduce operations costs, and other benefits readily apparent to those of ordinary skill in the art.

Fiber-bundle type mass transfer device 100 may be used to promote mass transfer in unit operations. In some embodiments, fiber-bundle type mass transfer device 100 may be used in caustic treatment, amine treatment, or acid treatment processes for example. Some other applications of fiber-bundle type mass transfer device 100 may include liquid-liquid extraction, gas-liquid extraction, liquid-liquid reactions, and gas-liquid reactions, for example. Although only a few select processes and fluids will be described herein, it will be readily apparent to those of ordinary skill in the art that there may be other potential applications for fiber-bundle type mass transfer device 100 that are not described. One of ordinary skill in the art, with the benefit of this disclosure should be able to adapt fiber-bundle type mass transfer device 100 to any number of applications not explicitly enumerated herein.

In an embodiment, fiber-bundle type mass transfer device 100 may be used in a caustic treatment application whereby a hydrocarbon fluid and a caustic fluid are introduced into fiber-bundle type mass transfer device 100. The hydrocarbon fluid and the caustic fluid may be contacted such that impurities in the hydrocarbon fluid react with the caustic fluid to reduce the amount of impurities in the hydrocarbon fluid. Some common impurities that may be removed may include carbon dioxide, organic acids such as carboxylic acids, mercaptans, also known as thiols, as well as hydrogen sulfide, carbonyl sulfide, and other common sulfur impurities found in hydrocarbon fluid. The caustic fluid may comprise water and a caustic agent such as sodium hydroxide, potassium hydroxide, or other compounds that release a hydroxide ion when added to water. The caustic treatment process may be appropriate for treatment of any hydrocarbon fluid including, but not limited to, hydrocarbons such as alkanes, alkenes, alkynes, and aromatics, for example. The hydrocarbons may comprise hydrocarbons of any chain length, for example, from about $C_3$ to about $C_{30}$, or greater, and may comprise any amount of branching. Some exemplary hydrocarbon fluids may include, but are not limited to, crude oil, propane, LPG, butane, light naphtha, isomerate, heavy naphtha, reformate, jet fuel, kerosene, diesel oil, hydrotreated distillate, heavy vacuum gas oil, light vacuum gas oil, gas oil, coker gas oil, alkylates, fuel oils, light cycle oils, and combinations thereof.

Another application of fiber-bundle type mass transfer device 100 may be in an amine treatment application whereby a hydrocarbon fluid and an amine fluid are introduced into fiber-bundle type mass transfer device 100. The hydrocarbon fluid and the amine fluid may be contacted such that impurities in the hydrocarbon feed react with the amine feed to reduce the amount of impurities in the hydrocarbon feed. Amine treatment may be used to remove contaminants that react with an amine such as hydrogen sulfide and carbon dioxide, for example. The hydrocarbon fluid may be any hydrocarbon feed as described above. In an amine application, the amine fluid may comprise water, for example, and an amine such as diethanolamine, monoethanolamine, methyldiethanolamine, diisopropanolamine, aminoethoxyethanol, diglycolamine, and combinations thereof.

As mentioned above, there may exist challenges with designing and operating fiber-bundle type contactors such as fiber-bundle type mass transfer device 100 illustrated in FIG. 1. As will be explained in detail below, one method to overcome some challenges with fiber-bundle type contactors may be to incorporate multiple stages of fluid-fluid contact. Multiple stages of fluid-fluid contact may increase the contact surface area between the fluids and therefore may increase the mass transfer between the fluid phases. FIGS. 2-5 illustrate embodiments of contacting vessels with multiple stages of fluid contact which may improve mass transfer in fiber-bundle type contactors. Any of the contacting vessels described in FIGS. 2-5 may be utilized as a standalone unit or incorporated into larger units such as fiber-bundle type mass transfer device 100. For example, any of the embodiments of contacting vessels disclosed in FIGS. 2-5 may be utilized alongside or in place of contacting vessel 104 in FIG. 1.

Figure 2:
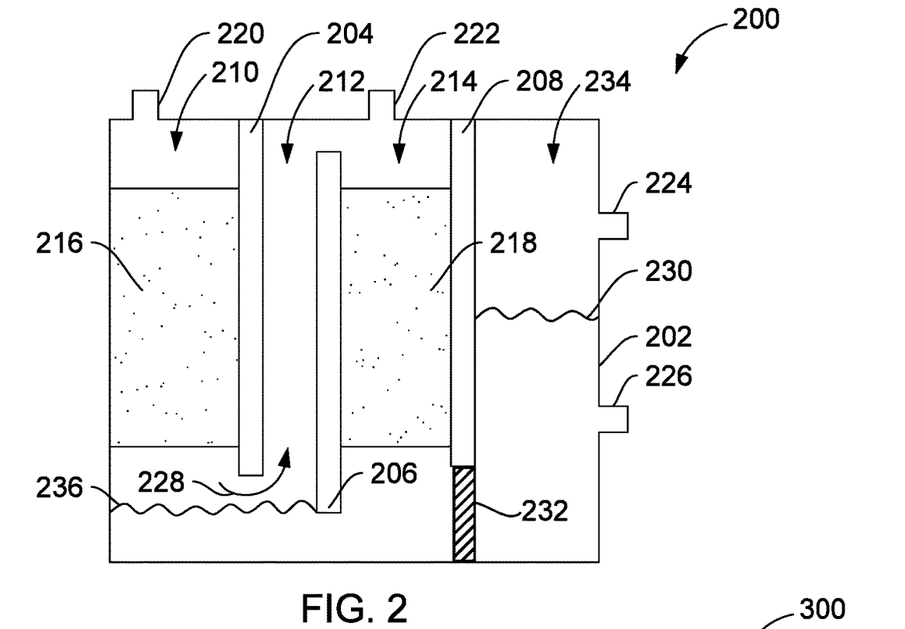
FIG. 2 is a schematic diagram illustrating an embodiment of a contacting vessel.

FIG. 2 is a cross sectional view of contacting vessel 200 which may include multiple fluid contact stages. In some examples, contacting vessel 200 may comprise a body 202 which may include partitions 204, 206, and 208 which may segregate various sections of body 202. As illustrated, a first flow path 210 may be defined between body 202 and partition 204, a second flow path 212 may be defined between partition 204 and partition 206, a third flow path 214 may be defined between partition 206 and partition 208, and a fourth flow path 234 may be defined between body 202 and partition 208. A first fiber bundle 216 may be disposed within first flow path 210 and a second fiber bundle 218 may be disposed within third flow path 214. The fiber bundles may include any material of construction, including, but not limited to the materials previously described herein. Contacting vessel 200 may further include first inlet 220, second inlet 222, first outlet 224 and second outlet 226 which may provide for mass flow into and out of body 202.

Contacting vessel 200 may be utilized for various unit operations including liquid-liquid extraction, gas-liquid extraction, liquid-liquid reactions, and gas-liquid reactions, for example. Some specific liquid-liquid extractions may include caustic treatment and amine treatment, for example. Further, the geometry of contacting vessel 200 including positioning and quantity of partitions and fiber bundles may be changed such that contacting vessel 200 may be adapted to suit various needs. Some more advanced geometries will be discussed in detail below.

A fluid comprising two immiscible phases ("the fluid") may be introduced into vessel 202 via first inlet 220. The two immiscible phases may include any of the previously described fluids. For example, the immiscible phases may include a hydrocarbon fluid and an aqueous fluid which do not readily mix to for a homogeneous mixture. In some embodiments, the two immiscible phases may include a caustic fluid and a hydrocarbon fluid. The caustic fluid may comprise an aqueous caustic solution as previously described. In some embodiments, the fluid comprising two immiscible fluids may comprise an amine fluid and a hydrocarbon fluid. The amine fluid may comprise an aqueous amine solution as previously described. Although the fluids are described as immiscible, there may be some mass transfer between the fluids such that a portion of the mass from the first phase becomes dispersed in the bulk mass of the second phase. The two immiscible phases may have disparate densities such that the first phase may be considered the relatively less dense phase, or lighter phase, and the second phase may be considered the relatively denser or heavier phase. Disparate densities may cause the two immiscible fluids to spontaneously stratify into distinct phases upon settling. In some embodiments, the two immiscible phases may have similar densities where a clear boundary between the phases may not exist. However, such fluids may still be utilized in embodiments of the present disclosure as there may be additional forces which may drive phase separation. For example, disparate intermolecular force types and polarity may drive the spontaneous separation of the phases. While the embodiments described herein may be directed to a fluid including two immiscible phases, in some embodiments, the fluid may include more than two immiscible phases, such as three immiscible phases, four immiscible phases, or more.

The fluid introduced into contacting vessel 200 via first inlet 220 may be from any source including from a mixing zone, such as mixing zone 102 as shown in FIG. 1. Alternatively, contacting vessel 200 may be a standalone unit whereby the fluid comprising the two immiscible fluids may be directly introduced into contacting vessel 200 without prior mixing. Still further, the individual fluid phases may be individually introduced into contacting vessel 200 via one or more inlets to contacting vessel 200.

After introducing the fluid into contacting vessel 200, the fluid may contact first fiber bundle 216 and begin to flow along the length of fiber bundle 216. One phase of the fluid may be differentially attracted to fibers of first fiber bundle 216 which may cause the attracted fluid to at least partially flow along the individual fibers of first fiber bundle 216. The fluid phase which is not differentially attracted may at least partially flow between the individual fibers of first fiber bundle 216 Depending on the chemical identity of components contained within the fluid phases, mass transfer or chemical reactions make take place as the fluid moves through first fiber bundle 216. In some examples, such as caustic treatment, hydroxide ions present in an aqueous phase may react with thiol containing compounds in a hydrocarbon phase. A reaction product of thiol and hydroxide may be more soluble in the aqueous phase than the hydrocarbon phase which may drive the reaction product to dissolve in the aqueous phase. Similarly, mass transfer between the phases may occur in liquid-liquid extraction, gas-liquid extraction, liquid-liquid reactions, and gas-liquid reactions, for example.

The fluid phases may traverse the length of first fiber bundle 216 and separate into stratified layers at interface 236. At interface 236, the two phases immiscible phases may separate into two distinct phases whereby the relatively less dense phase, or lighter phase, may form a fluid layer on top of the relatively denser, or heavier phase. Density differences between the phases of the fluid may be the primary driving force for phase separation at interface 236. Once the relatively lighter phase has separated from the relatively denser phase, the relatively lighter phase may flow through second flow path 212 as indicated by arrow 228. Typically, when the fluid introduced into contacting vessel 200 is a hydrocarbon/aqueous mixture such as in caustic treatment, the less dense phase is the hydrocarbon portion of the mixture and the denser phase is the aqueous portion of the mixture. In such examples the hydrocarbon phase may separate at interface 236 and flow through second flow path 212.

After flowing through second flow path 212, the less dense phase may flow into third flow path 214. As the denser phase has separated at interface 236, additional make-up of denser phase may be required to continue the unit operation.

Additional make-up denser phase may be introduced through second inlet 222 whereby the additional make-up denser phase and lighter phase from second flow path 212 may come into contact. The additional make-up denser phase may have the same chemical identity as the denser phase introduced into first inlet 220 or may have a disparate chemical identity. The lighter phase from second flow path 212 and additional make-up denser phase from second inlet 222 may flow into third flow path 214 and contact second fiber bundle 218. Again, one of the phases may be differentially attracted to the fibers of second fiber bundle 218 which may cause the attracted fluid to at least partially flow along the individual fibers of second fiber bundle 218. The fluid phase which is not differentially attracted may at least partially flow between the individual fibers of second fiber bundle 218. Contact between the phases in first fiber bundle 216 may be considered a first stage of contact. Contact between the phases in second fiber bundle 218 may be considered a second stage of contact. Although only two contact stages are illustrated in FIG. 2, the number of contact stages may be extended to three, four, or even more stages.

After the additional make-up denser phase and lighter phase from second flow path 212 have traversed a length of second fiber bundle 218, the phases may separate again at interface 230. Again, density differences, intermolecular forces, and polarity may drive the spontaneous separation of the phases. A coalescer 232 may be disposed within body 202 to promote the separation of the lighter and denser phases. Coalescer 232 may be any device which promotes coalescence of dispersed droplets. Some non-limiting examples of suitable coalerscers may include, but are not limited to, mechanical coalecers, coalescing pads, electrostatic coalescers, and combinations thereof. Once the phases are separated at interface 230, the relatively lighter phase may be drawn out of contacting vessel 200 through first outlet 224 and the relatively denser phase may be drawn out of contacting vessel 200 through second outlet 226.

Figure 3A:
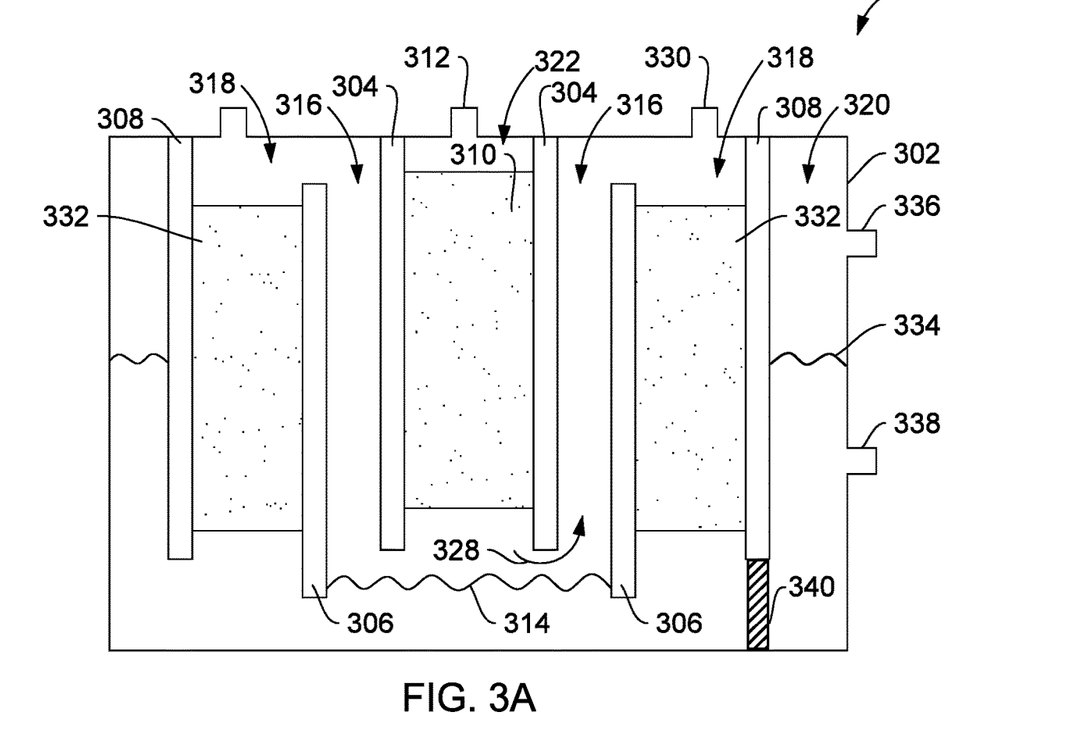
FIG. 3A is a schematic diagram illustrating a side profile view of an embodiment of a contacting vessel.
Figure 3B:
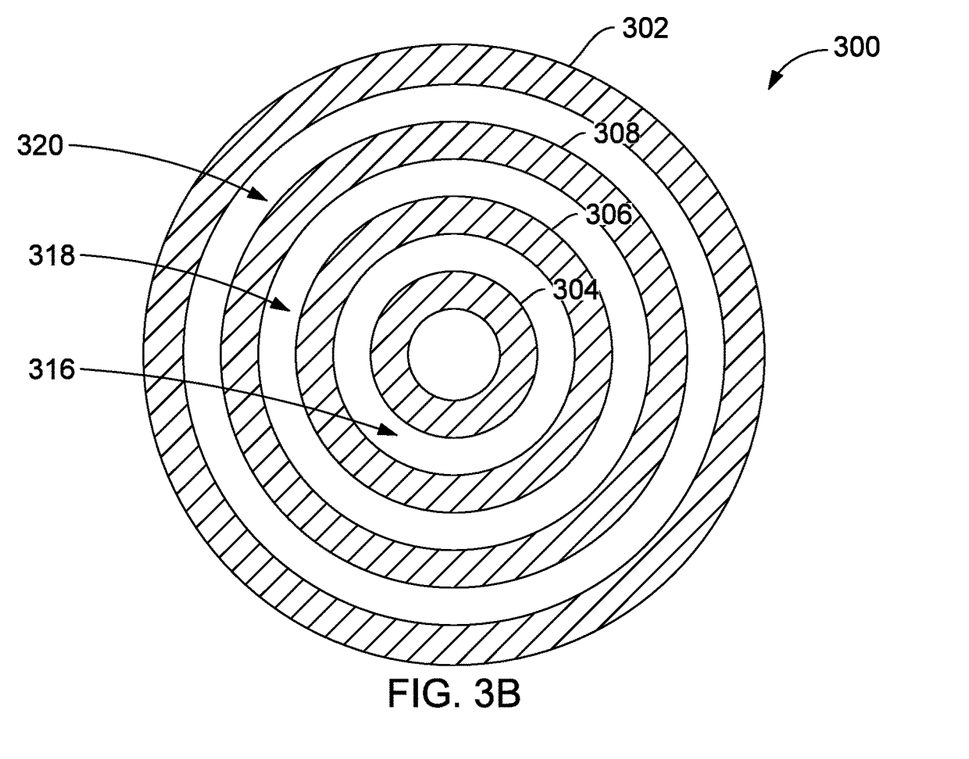
FIG. 3B is a schematic diagram illustrating a cross sectional view of an embodiment of a contacting vessel.

FIG. 3A is a side profile view of another embodiment of a contacting vessel 300 and FIG. 3B is a cross sectional view of contacting vessel 300. Contacting vessel 300 may include a plurality of nested conduits which may be positioned within contacting vessel 300 such that flow channels are formed between the plurality of nested conduits. The conduits may function as partitions to define flow channels as previously described. The flow channels may define a plurality of contact stages through which fluids introduced into contacting vessel 300 may flow. As shown in FIGS. 3A and 3B, contacting vessel 300 may comprise body 302, first conduit 304, second conduit 306, and third conduit 308. Although only three conduits are shown in FIGS. 3A and 3B, any number of nested conduits may be utilized to achieve any arbitrary number of flow paths and contact stages. Body 302, first conduit 304, second conduit 306, and third conduit 308 are illustrated in FIGS. 3A and 3B as circular conduits, however, body 302, and conduits 304, 306, and 308 may comprise any geometry.

First fiber bundle 310 may be disposed within first conduit 304. First fiber bundle 310 may be constructed from any suitable material, including those previously described herein. A fluid comprising two immiscible phases, such as the fluids previously described, may be introduced into contacting vessel 300 via first inlet 312. The fluid may enter the first flow path 322 and flow through first conduit 304 along first fiber bundle 310 until the fluid reaches interface 314. As previously described, the phases of the fluid may have different affinities for the fibers of fiber bundle 310 which may cause one phase to at least partially flow along the individual fibers and the second phase to at least partially flow between the individual fibers. Interface 314 may comprise stratified layers of the two phases of the fluid. As previously discussed, the two phases immiscible phases of the fluid may spontaneously separate into two distinct phases after traversing a fiber bundle due to density differences, polarity, intermolecular forces, or any combination thereof. The relatively lighter phase of the fluid may flow into second flow path 316 defined between conduit 304 and conduit 306 as indicated by arrow 328.

After flowing through second flow path 316, the less dense phase may flow into third flow path 318 defined between conduit 306 and conduit 308. As the denser phase has separated at interface 314, additional make-up of denser phase may be required to continue the unit operation. Additional make-up denser phase may be introduced through second inlet 330 and the additional make-up denser phase and lighter phase from second flow path 316 may come into contact. The additional make-up denser phase may have the same chemical identity as the denser phase introduced into first inlet 312 or may have a disparate chemical identity. The lighter phase from second flow path 316 and additional make-up denser phase from second inlet 330 may flow into third flow path 318 and contact second fiber bundle 332. Again, one of the phases may be differentially attracted to the fibers of second fiber bundle 332 which may cause the attracted fluid to at least partially flow along the individual fibers of second fiber bundle 332. The fluid phase which is not differentially attracted may at least partially flow between the individual fibers of second fiber bundle 332. Contact between the phases in first fiber bundle 310 may be considered a first stage of contact. Contact between the phases in second fiber bundle 332 may be considered a second stage of contact. Although only two contact stages are illustrated in FIGS. 3A and 3B, the number of contact stages may be extended to three, four, or even more stages by incorporation of additional conduits and fiber bundles.

After the additional make-up denser phase and lighter phase from second flow path 316 have traversed a length of second fiber bundle 332, the phases may separate again at interface 334. A coalescer 340 may be disposed within body 302 to promote the separation of the lighter and denser phases. Coalescer 340 may include any of the previously discussed coalesecers. Again, density differences, intermolecular forces, and polarity may drive the spontaneous separation of the phases. Once the phases are separated at interface 334, the relatively lighter phase may be drawn out of contacting vessel 300 through first outlet 336 and the relatively denser phase may be drawn out of contacting vessel 300 through second outlet 338.

Figure 4A:
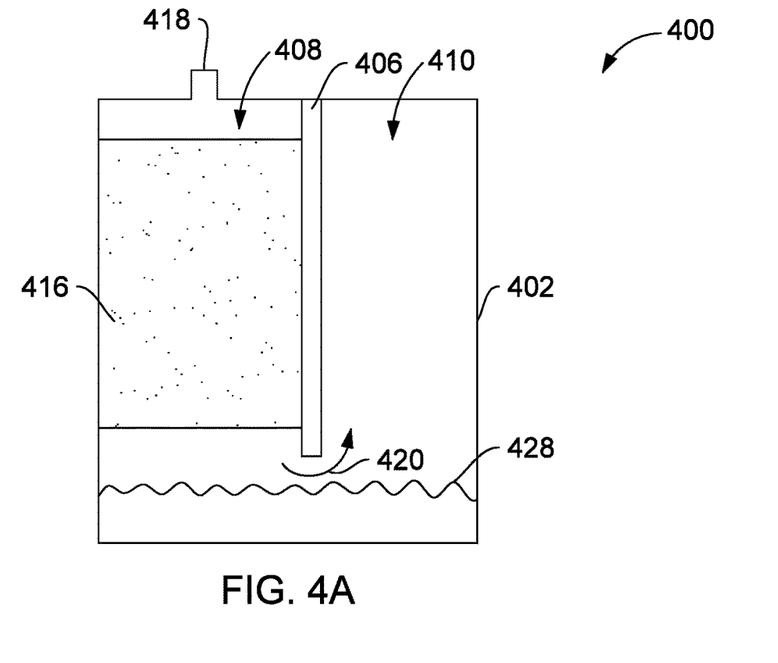
FIG. 4A is a schematic diagram illustrating a side profile view of an embodiment of a contacting vessel.
Figure 4B:
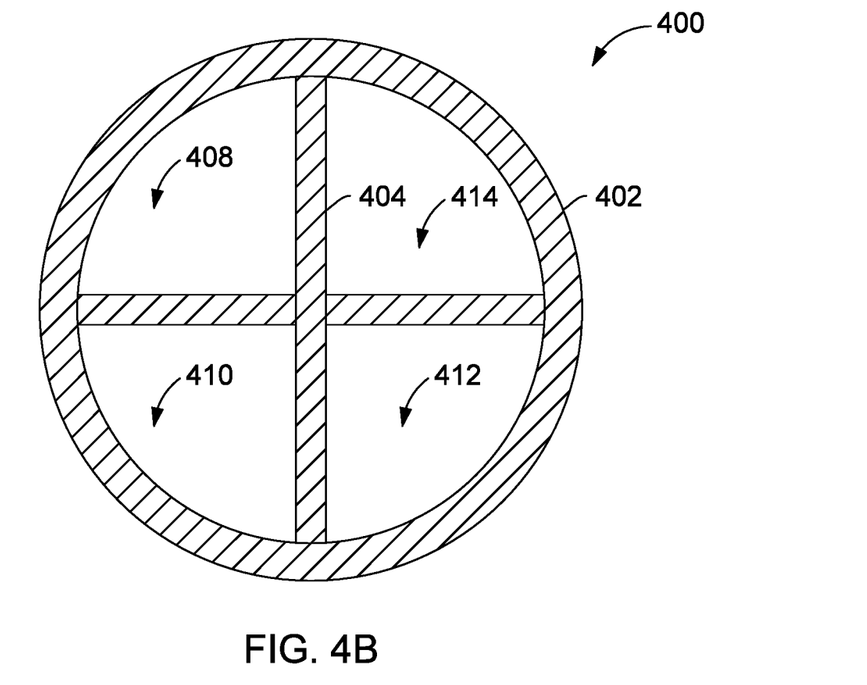
FIG. 4B is a schematic diagram illustrating a cross sectional view of an embodiment of a contacting vessel.

FIG. 4A is a side profile view of another embodiment of a contacting vessel 400 and FIG. 4B is a cross sectional view of contacting vessel 400. Contacting vessel 400 may include body 402 and a series of partitions which define interconnected flow paths. With reference to FIG. 4B, body 402 include a first partition 404 and a second partition 406 disposed within body 402 and arranged such that first flow path 408, second flow path 410, third flow path 412, and fourth flow path 414 are defined within body 402. Although only two partitions are shown in FIG. 4B which defined four independent flow paths, any number of partitions and corresponding flow paths may be defined within body 402. For example, body 402 may comprise a single partition and two flow paths. Alternatively, body 402 may comprise three, four, five, six, or more partitions and corresponding number of flow paths for each number of partitions. First partition 404 and second partition 406 may be arranged such that the flow paths defined therebetween are fluidically connected.

With reference to FIG. 4A, a side profile view of contacting vessel is illustrated with partition 406 disposed within body 402 defining flow path 408 and flow path 410. As in the previous embodiments described herein, a first fiber bundle 416 may be disposed within first flow path 408. First fiber bundle 416 may be constructed from any suitable material, including those previously described herein. A fluid comprising two immiscible phases, such as the fluids previously described, may be introduced into contacting vessel 400 via first inlet 418. The fluid may contact first fiber bundle 416 and flow through first flow path 408 until the fluid reaches interface 428. As previously described, the phases of the fluid may have different affinities for the fibers of fiber bundle 416 which may cause one phase to at least partially flow along the individual fibers and the second phase to at least partially flow between the individual fibers. Interface 428 may comprise stratified layers of the two phases of the fluid. As previously discussed, the two immiscible phases of the fluid may spontaneously separate into two distinct phases after traversing a fiber bundle due to density differences, polarity, intermolecular forces, or any combination thereof. The relatively lighter phase of the fluid may flow into second flow path 410 as indicated by arrow 420.

Figure 4C:
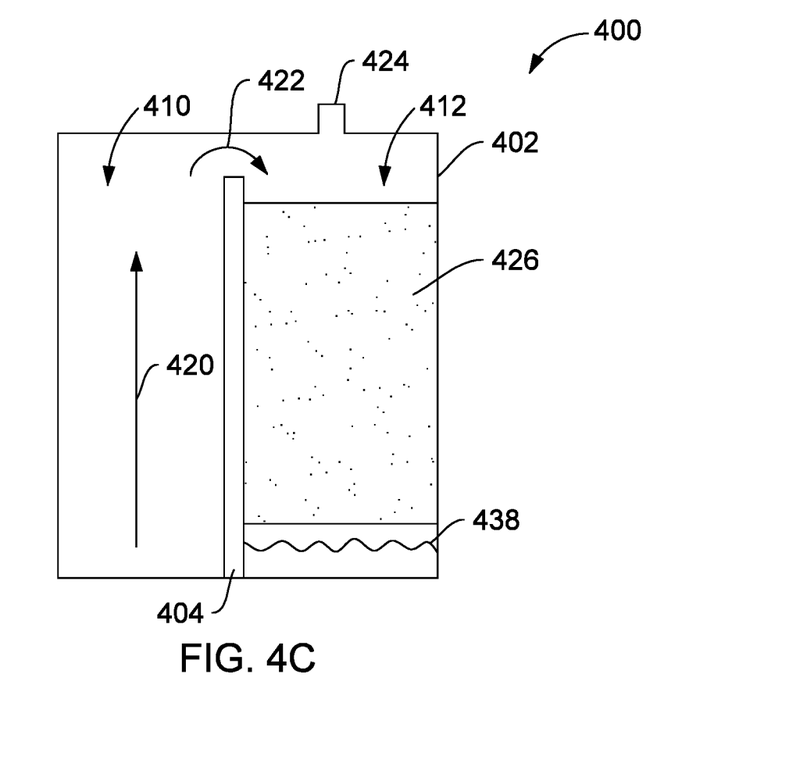
FIG. 4C is a schematic diagram illustrating a side profile view of an embodiment of a contacting vessel.

FIG. 4C is a second side profile view of contacting vessel 400 showing second flow path 410 and third flow path 412. The relatively lighter phase of the fluid separated at interface 428 may flow through second flow channel 410 as indicated by arrow 420 and into third flow path 412 as indicated by arrow 422. As the denser phase has separated at interface 428, additional make-up of denser phase may be required to continue the unit operation. Additional make-up denser phase may be introduced through second inlet 424 and the additional make-up denser phase and lighter phase from second flow path 410 may come into contact. The additional make-up denser phase may have the same chemical identity as the denser phase introduced into first inlet 418 or may have a disparate chemical identity. The lighter phase from second flow path 410 and additional make-up denser phase from second inlet 424 may flow into third flow path 412 and contact second fiber bundle 426. Again, one of the phases may be differentially attracted to the fibers of second fiber bundle 426 which may cause the attracted fluid to at least partially flow along the individual fibers of second fiber bundle 426. The fluid phase which is not differentially attracted may at least partially flow between the individual fibers of second fiber bundle 426. Contact between the phases in first fiber bundle 416 may be considered a first stage of contact. Contact between the phases in second fiber bundle 426 may be considered a second stage of contact. After flowing through third flow path 412, the fluid may leave second fiber bundle 426 and separate as previously described at interface 438.

Figure 4D:
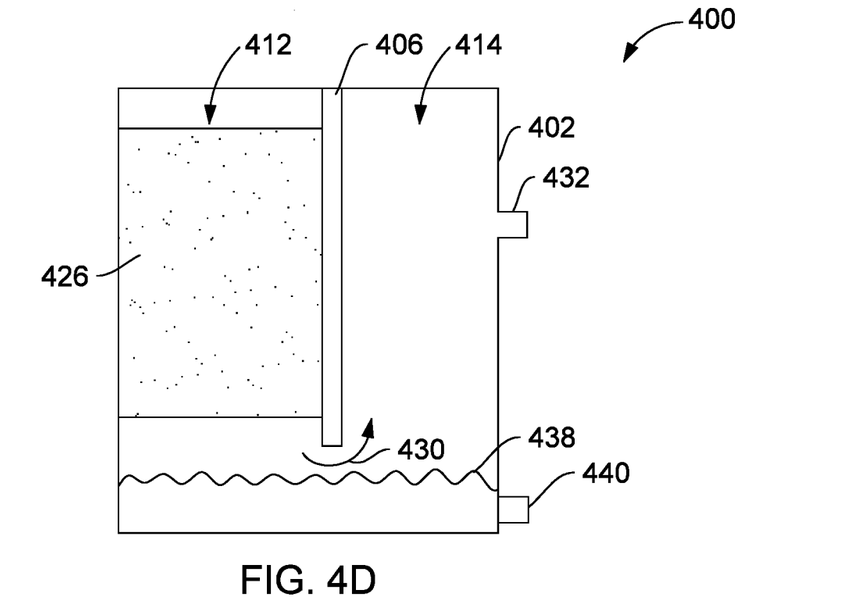
FIG. 4D is a schematic diagram illustrating a side profile view of an embodiment of a contacting vessel.

FIG. 4D is a third side profile view of contacting vessel 400 showing third flow path 412 and fourth flow path 414. After the fluid has flowed through third flow path and separated at interface 438 as described with reference to FIG. 4C, the relatively lighter phase may flow though fourth flow path 414 as indicated by arrow 430. In some embodiments, fourth flow path 414 and first flow path 408 may be fluidically connected such that the relatively lighter phase separated at interface 438 may be "recycled" with a pump back to first flow path 408 for further contacting to further progress mass transfer and/or reactions between the phases of the fluid. Alternatively, the relatively lighter phase separated at interface 438 may be drawn out of contacting vessel 400 via outlet 432 and the relatively heavier phase may be drawn out via outlet 440.

Figure 5A:
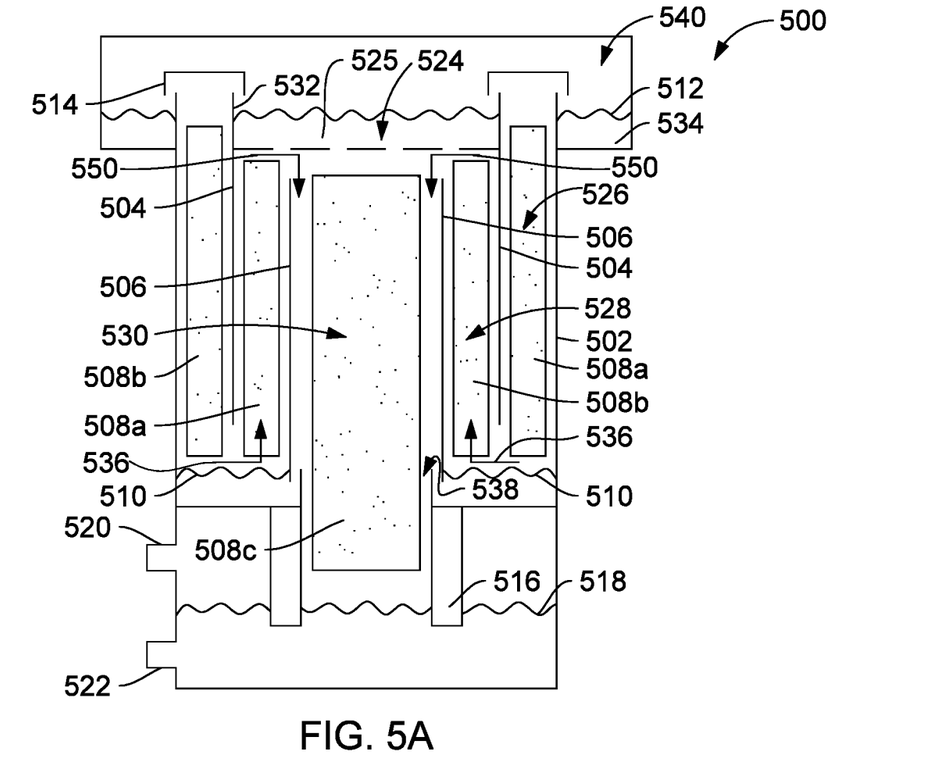
FIG. 5A is a schematic diagram illustrating a side profile view of an embodiment of a contacting vessel.

FIG. 5A is a side profile view of another embodiment of a contacting vessel 500. Contacting vessel 500 may comprise body 502 and a series of conduits which may define interconnected flow paths within body 502. The conduits may function as partitions to define flow paths as described above. A first flow path 526 may be defined between first conduit 504 and body 502. A second flow path 528 may be defined between first conduit 504 and second conduit 506. A third flow path 530 may be defined as the interior of conduit 506. A first fiber bundle 508a may be disposed within first flow path 526, a second fiber bundle 508b may be disposed within second flow path 528 and a third fiber bundle 508c may be disposed within third flow path 530. Although depicted as individual fiber bundles, in some embodiments, fiber bundles 508a, 508b, and 508c may comprise one fiber bundle which spans first flow path 526, second flow path 528, and third flow path 530. While only two conduits are depicted in FIG. 5, in embodiments, there may be any arbitrary number of conduits and corresponding flow paths as well as any number of fiber bundles disposed therein.

FIG. 5A further illustrates a mixing zone 540 whereby a fluid comprising two immiscible phases, such as the fluids previously described, may be introduced into, such as through inlets in mixing zone 540, and brought into contact. As depicted in FIG. 5A, the fluid may stratify into distinct layers or phases as depicted by interface 512. At interface 512 the relatively less dense phase may float on the relatively denser phase. Contacting vessel 500 may further comprise a perforated plate assembly 524 which may include a plate 534 comprising perforations 525. The relatively denser fluid phase may flow into second flow path 528 and third flow path 530 through perforations 525. Downpipe 532 may be disposed on perforated plate assembly 524 which may provide fluid communication between mixing zone 540 and first flow path 526. A hat 514 may be coupled to the downpipe 532 which may direct fluid into an interior of downpipe 532.

Figure 5B:
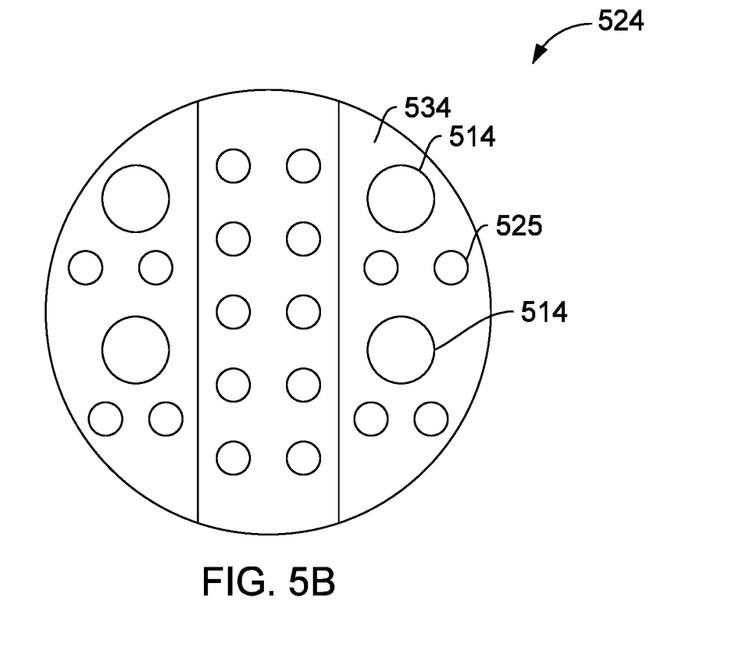
FIG. 5B is a schematic diagram illustrating a top view of a perforated plate assembly.
Figure 5C:
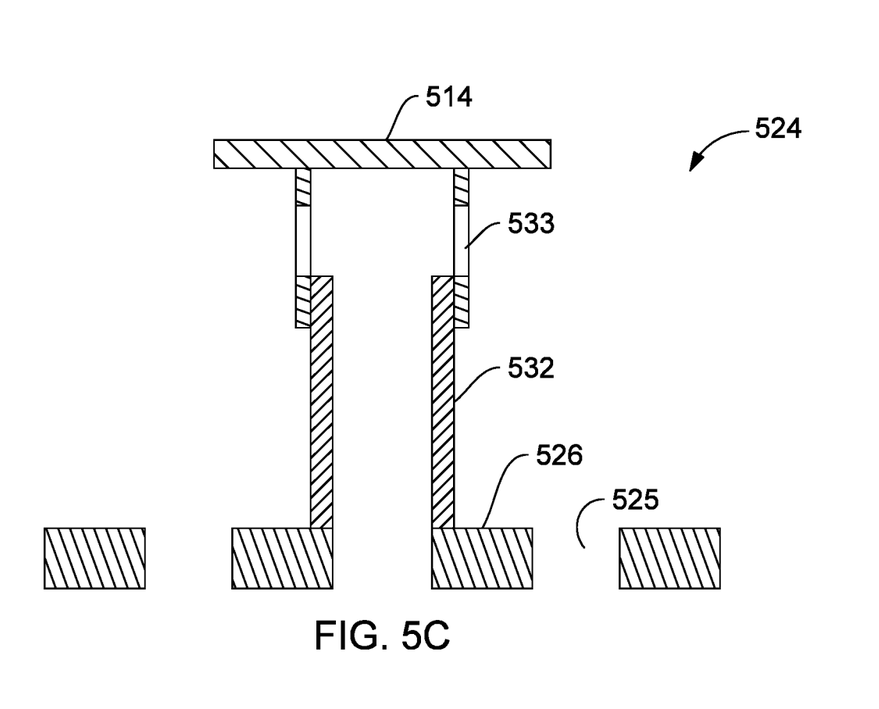
FIG. 5C is a schematic diagram illustrating a side profile view of a perforated plate assembly.

Reference will now be made to FIG. 5B and FIG. 5C. In FIG. 5B, a top view of perforated plate assembly 524 is illustrated. Perforated plate assembly 524 may comprise a plate 534 and a plurality of perforations 525 arranged on plate 534 to provide fluid communication through plate 534. Additionally, in FIG. 5B, a plurality of hats 514 is illustrated. As mentioned above, hat 514 may direct flow into downpipe 532. FIG. 5C is a side profile view of perforated plate assembly 524. As illustrated, plate 534 may comprise perforation 525 and downpipe 532 disposed on plate 534. Downpipe 532 may be disposed on perforation 525 to allow fluid communication through downpipe 532 and perforation 525. Hat 514 may be disposed on downpipe 532. Hat 514 may comprise perforations 533 such that fluids may flow into an interior of downpipe 532 via perforations 533.

With further reference to FIG. 5A, the fluids introduced into mixing zone 540 may flow into first flow path 526 by passing through perforation 525 (illustrated in FIG. 5C) or through down pipe 532. The fluid flowing into flow path 526 may include the relatively less dense phase, the relatively denser phase, or a combination thereof. The fluid may contact first fiber bundle 508a and flow through first flow path 526 until the fluid reaches interface 510. As previously described, the phases of the fluid may have different affinities for the fibers of fiber bundle 508a which may cause one phase to at least partially flow along the individual fibers and the second phase to at least partially flow between the individual fibers. Interface 510 may comprise stratified layers of the two phases of the fluid. As previously discussed, the two immiscible phases of the fluid may spontaneously separate into two distinct phases after traversing a fiber bundle due to density differences, polarity, intermolecular forces, or any combination thereof. The relatively lighter phase of the fluid may flow into second flow path 528 as indicated by arrow 536 and the relatively denser phase separated at interface 510 may flow into third flow path 530 as indicated by arrow 538. The relatively lighter phase separated at interface 510 may flow through second fiber bundle 508b within second flow channel 528 towards perforated plate assembly 524.

After the relatively less dense phase has flowed through second flow path 526, the relatively less dense phase may mix with additional relatively denser phase fluid flowing into second flow path 528 and third flow path 530 through perforations 525. The relatively less dense phase may mix with fresh relatively denser phase provided from perforations 525 and flow into third flow path 530 as indicated by arrow 550. The fluid comprising the relatively less dense phase from interface 510 and additional relatively denser phase may contact third fiber bundle 508c and flow through third flow path 530 until the fluid reaches interface 518. At interface 518 the phases may stratify again into distinct layers. A coalescer 516 may promote the coalescence of entrained droplets to form the stratified phase layers. The relatively lighter phase may be drawn off through first outlet 520 and the relatively denser phase may be drawn off through second outlet 522.

While some embodiments disclosed herein have been discussed in view of liquid-liquid applications, any of the previous embodiments, including those disclosed in FIG. 1, 2, 3A, 3B, 4A, 4B, 4C, 4D, 5A, 5B, or 5C may be utilized in gas-liquid applications where the relatively less dense phase is a gas or vapor and the relatively denser phase is a liquid. Further, any of the previously disclosed embodiments may be utilized in reaction applications whereby a chemical reaction occurs between the liquids in liquid-liquid applications or between the gas and liquid in gas-liquid applications. In catalyst applications, the fiber bundles may include catalyst impregnated into or otherwise attached to the fibers of the fiber bundles. Some examples of catalysts may include, but are not limited to those containing nickel, cobalt, iron, and other transition metals. Some reactions may be carried out at temperatures ranging from about 0-2200° F. and 0-2000 psig. Some specific reactions and applications may include bio reactors, steam methane reformation, hydrocarbon upgrade reactions, alkylation, hydrotreating, and homogeneous catalysis reactions, for example.

Accordingly, the present disclosure may provide methods, systems, and apparatus that may relate to fluid-fluid contacting. The methods, systems. and apparatus may include any of the various features disclosed herein, including one or more of the following statements.

Statement 1. An apparatus comprising: a body; a first partition in the body defining a first flow path between the body and the first partition; a first fiber bundle disposed within the first flow path; a second partition in the body defining a second flow path between the first partition and the second partition; a third partition in the body defining a third flow path between the second partition and the third partition; and a second fiber bundle disposed within the third flow path.

Statement 2. The fiber bundle contactor of statement 1 wherein the vessel further comprises a first inlet in fluid communication with the first flow path.

Statement 3. The fiber bundle contactor of any of statements 1-2 wherein the vessel further comprises a second inlet in fluid communication with the second flow path.

Statement 4. The fiber bundle contactor of any of statements 1-3 wherein the first flow path and the second flow path are in fluid communication, and wherein the second flow path and the third flow path are in fluid communication.

Statement 5. The fiber bundle contactor of any of statements 1-4 wherein a fourth flow path is defined between the body and the third partition, and wherein a coalescer is disposed within the fourth flow path.

Statement 6. The fiber bundle contactor of any of statements 1-5 further comprising a perforated plate assembly comprising a plate, a plurality of openings in the plate, and a plurality of downpipes that extend from the plate and arranged to allow fluid flow through additional openings in the plate.

Statement 7. The fiber bundle contactor of any of statements 1-6 wherein the fiber bundles comprise a catalyst.

Statement 8. A method comprising: introducing a fluid comprising a first immiscible phase and a second immiscible phase into a contacting vessel comprising multiple contact stages: flowing the fluid through a first fiber bundle disposed in the contacting vessel; separating at least a portion of the first immiscible phase from the second immiscible phase; and flowing the separated portion of the first immiscible phase through a second fiber bundle disposed in the contacting vessel.

Statement 9. The method of statement 8 wherein the contacting vessel comprises a series of nested conduits and a plurality of flow paths between the series of nested conduits.

Statement 10. The method of any of statements 8-9 wherein the first immiscible phase comprises a hydrocarbon fluid, and wherein the second immiscible phase comprises an aqueous fluid.

Statement 11. The method of any of statements 8-10 wherein the aqueous fluid comprises at least one item selected from the group consisting of an amine, a hydroxide, a homogeneous catalyst, a bacteria, an enzyme, and combinations thereof.

Statement 12. The method of any of statements 8-11 wherein the step of separating comprises settling the fluid and forming stratified layers of the first immiscible phase and the second immiscible phase Statement 13. The method of any of statements 8-12 further comprising mixing the separated portion of the first immiscible phase with additional second immiscible phase before the step of flowing the separated portion of the first immiscible phase through a second fiber bundle.

Statement 14. The method of any of statements 8-13 further comprising contacting the separated portion of the first immiscible phase with a coalescer after the step of flowing the separated portion of the first immiscible phase through the second fiber bundle.

Statement 15. The method of any of statements 8-14 wherein at least one of the first fiber bundle, the second fiber bundle, or both comprise a catalyst, and wherein the method further comprises contacting at least one of the first immiscible phase, the second immiscible phase, or both with the catalyst thereby catalyzing a reaction between at least one chemical species present in at least one of the first a first immiscible phase, the second immiscible phase, or both.

Statement 16. A method comprising: introducing a fluid comprising a hydrocarbon fluid and an aqueous fluid into a contacting vessel; flowing the fluid through a first fiber bundle disposed in the contacting vessel; separating a portion of the hydrocarbon from the fluid; combining the separated portion of the hydrocarbon with an additional amount of the aqueous solution to form a second fluid; and flowing the second fluid through a second fiber bundle disposed in the contacting vessel.

Statement 17. The method of statement 16 wherein the aqueous fluid comprises a hydroxide.

Statement 18. The method of any of statements 16-17 wherein the aqueous fluid comprises at least one item selected from the group consisting of an amine, a homogeneous catalyst, a bacteria, an enzyme, and combinations thereof.

Statement 19. The method of any of statements 16-18 further comprising separating a second portion of the hydrocarbon fluid from the second fluid, combining the second portion of the hydrocarbon fluid with an additional amount of the aqueous fluid to form a third fluid, and flowing the third fluid through a third fiber bundle disposed in the contacting vessel.

Statement 20. The method of any of statements 16-19 wherein at least one of the first fiber bundle, the second fiber bundle, or both comprise a catalyst.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. An apparatus comprising:
a body;
a first partition in the body defining a first flow path between the body and the first partition;
a first fiber bundle disposed within the first flow path;
a second partition in the body defining a second flow path between the first partition and the second partition;
a third partition in the body defining a third flow path between the second partition and the third partition; and
a second fiber bundle disposed within the third flow path,
wherein the apparatus is configured for flow of a fluid phase from the first flow path to the second flow path and is further configured for flow of a relatively denser fluid phase from the first flow path to the third flow path.

2. The apparatus of claim 1 wherein the apparatus further comprises a first inlet in fluid communication with the first flow path.

3. The apparatus of claim 1 wherein the apparatus further comprises a second inlet in fluid communication with the second flow path.

4. The apparatus of claim 1 wherein the first flow path and the second flow path are in fluid communication, and wherein the second flow path and the third flow path are in fluid communication.

5. The apparatus of claim 1 wherein a fourth flow path is defined between the body and the third partition, and wherein a coalescer is disposed within the fourth flow path.

6. The apparatus of claim 1 further comprising a perforated plate assembly comprising a plate, a plurality of openings in the plate, and a plurality of downpipes that extend from the plate and arranged to allow fluid flow through additional openings in the plate.

7. The apparatus of claim 1 wherein the fiber bundles comprise a catalyst.

8. A method comprising:
introducing a fluid comprising a first immiscible phase and a second immiscible phase into a contacting vessel comprising;
a body;
a first partition in the body defining a first flow path between the body and the first partition;
a first fiber bundle disposed within the first flow path;
a second partition in the body defining a second flow path between the first partition and the second partition;
a third partition in the body defining a third flow path between the second partition and the third partition; and
a second fiber bundle disposed within the third flow path;
flowing the fluid through the first fiber bundle disposed in the first flow path;
separating at least a portion of the first immiscible phase from the second immiscible phase;
flowing the separated portion of the first immiscible phase through the second flow path to the second fiber bundle disposed in the third flow path; and
flowing at least a portion of second immiscible phase from the first flow path to the third flow path.

9. The method of claim 8 wherein the contacting vessel comprises a series of nested conduits and a plurality of flow paths between the series of nested conduits.

10. The method of claim 8 wherein the first immiscible phase comprises a hydrocarbon fluid, and wherein the second immiscible phase comprises an aqueous fluid.

11. The method of claim 10 wherein the aqueous fluid comprises at least one item selected from the group consisting of an amine, a hydroxide, a homogeneous catalyst, a bacteria, an enzyme, and combinations thereof.

12. The method of claim 8 wherein the step of separating comprises settling the fluid and forming stratified layers of the first immiscible phase and the second immiscible phase.

13. The method of claim 8 further comprising mixing the separated portion of the first immiscible phase with additional second immiscible phase before the step of flowing the separated portion of the first immiscible phase through a second fiber bundle.

14. The method of claim 8 further comprising contacting the separated portion of the first immiscible phase with a coalescer after the step of flowing the separated portion of the first immiscible phase through the second fiber bundle.

15. The method of claim 8 wherein at least one of the first fiber bundle, the second fiber bundle, or both comprise a catalyst, and wherein the method further comprises contacting at least one of the first immiscible phase, the second immiscible phase, or both with the catalyst thereby catalyzing a reaction between at least one chemical species present in at least one of the first a first immiscible phase, the second immiscible phase, or both.

16. A method comprising:
    introducing a fluid comprising a hydrocarbon fluid and an aqueous fluid into a contacting vessel comprising:
        a body;
        a first partition in the body defining a first flow path between the body and the first partition;
        a first fiber bundle disposed within the first flow path;
        a second partition in the body defining a second flow path between the first partition and the second partition;
        a third partition in the body defining a third flow path between the second partition and the third partition; and
        a second fiber bundle disposed within the third flow path;
    flowing the fluid through the first fiber bundle disposed in the first flow path;
    separating a portion of the hydrocarbon from the fluid to form a separated hydrocarbon portion and a separated aqueous portion;
    flowing the separated hydrocarbon portion through the second flow path and combining the separated portion of the hydrocarbon with an additional amount of the aqueous solution to form a second fluid;
    flowing the separated aqueous portion from the first flow path to the third flow path; and
    flowing the second fluid through the second fiber bundle disposed in the third flow path.

17. The method of claim 16 wherein the aqueous fluid comprises a hydroxide.

18. The method of claim 16 wherein the aqueous fluid comprises at least one item selected from the group consisting of an amine, a homogeneous catalyst, a bacteria, an enzyme, and combinations thereof.

19. The method of claim 16 further comprising separating a second portion of the hydrocarbon fluid from the second fluid, combining the second portion of the hydrocarbon fluid with an additional amount of the aqueous fluid to form a third fluid, and flowing the third fluid through a third fiber bundle disposed in the contacting vessel.

20. The method of claim 16 wherein at least one of the first fiber bundle, the second fiber bundle, or both comprise a catalyst.

21. An apparatus comprising:
    a body;
    a first partition in the body defining a first flow path between the body and the first partition;
    a first fiber bundle disposed within the first flow path;
    a second partition in the body defining a second flow path between the first partition and the second partition;
    a third partition in the body defining a third flow path between the second partition and the third partition;
    a second fiber bundle disposed within the third flow path;
    a fourth flow path defined between the body and the third partition; and
    a coalescer disposed within the fourth flow path.

22. An apparatus comprising:
    a body;
    a first partition in the body defining a first flow path between the body and the first partition;
    a first fiber bundle disposed within the first flow path;
    a second partition in the body defining a second flow path between the first partition and the second partition;
    a third partition in the body defining a third flow path between the second partition and the third partition;
    a second fiber bundle disposed within the third flow path; and
    a perforated plate assembly comprising a plate, a plurality of openings in the plate, and a plurality of downpipes that extend from the plate and arranged to allow fluid flow through additional openings in the plate, wherein the perforated plate assembly is disposed to allow fluid to flow into the first flow path.

23. An apparatus comprising:
    a body;
    a first partition in the body defining a first flow path between the body and the first partition;
    a first fiber bundle disposed within the first flow path;
    a second partition in the body defining a second flow path between the first partition and the second partition;
    a third partition in the body defining a third flow path between the second partition and the third partition; and
    a second fiber bundle disposed within the third flow path, wherein the fiber bundles comprise a catalyst.

* * * * *